Jan. 14, 1936.   J. A. SHAW   2,028,124
SEPARATION AND PURIFICATION OF GASEOUS MIXTURES
Filed Oct. 24, 1931
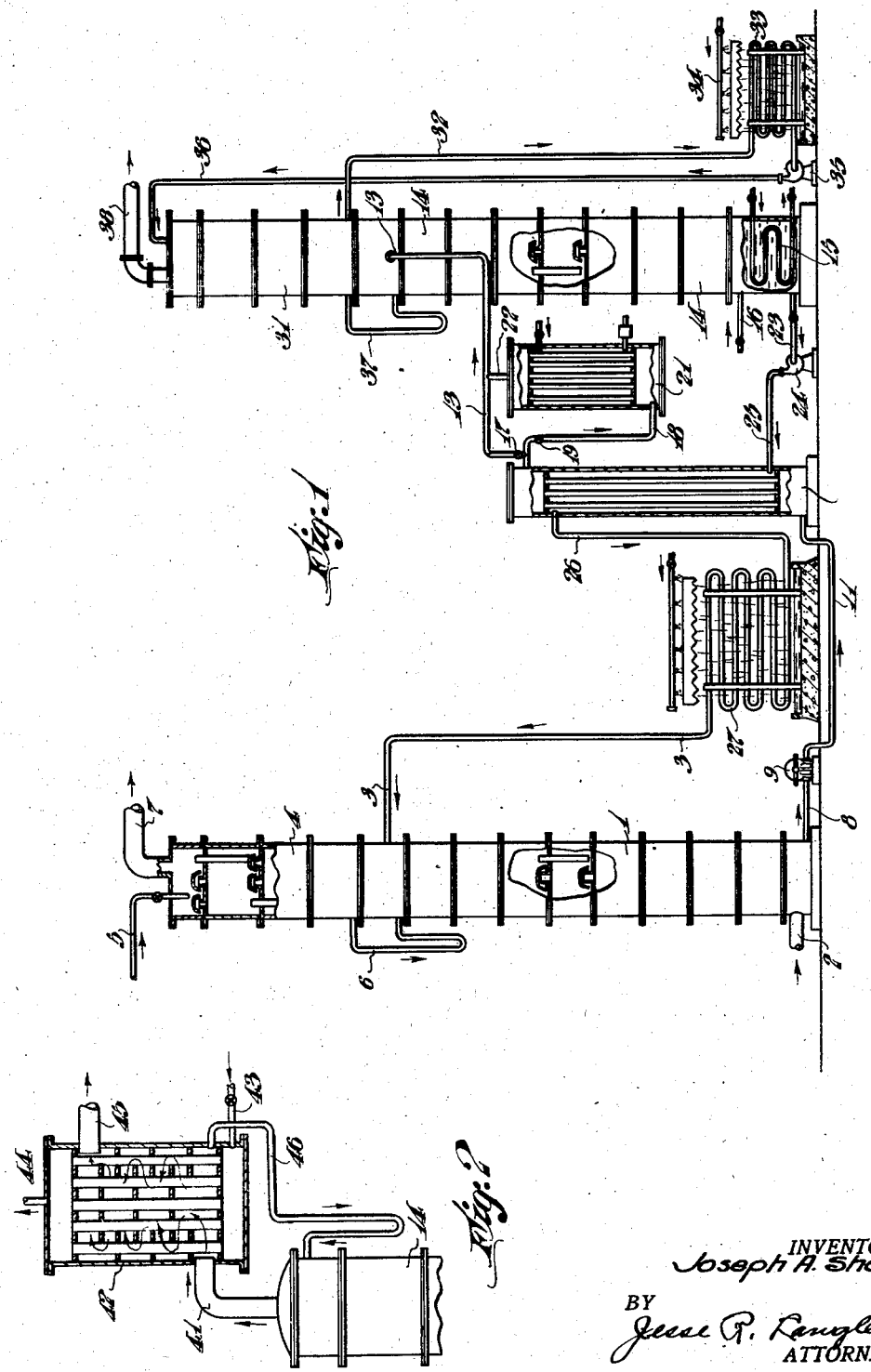
INVENTOR.
Joseph A. Shaw.
BY
Jesse P. Langley
ATTORNEY.

Patented Jan. 14, 1936

2,028,124

UNITED STATES PATENT OFFICE 2,028,124

SEPARATION AND PURIFICATION OF GASEOUS MIXTURES

Joseph A. Shaw, Pittsburgh, Pa., assignor to The Koppers Company of Delaware, a corporation of Delaware Application October 24, 1931, Serial No. 570,961

18 Claims. (Cl. 23—2)

This invention relates to the treatment of gaseous mixtures, such, for example, as coal gas, oil gas, water gas, natural gas, air and gases of combustion.

My invention has for an object the provision of a process for separating from such gaseous mixtures such acidic gases as hydrogen sulphide, carbon dioxide and hydrogen cyanide.

A further object of my invention is to provide a process for purifying fuel gases and other gaseous mixtures in which such acidic gases occur as impurities.

My invention has for further objects such other operative advantages and results as may hereinafter be found to obtain.

I have found that the separation or purification of a gaseous mixture of the character recited hereinabove may be advantageously carried out by treating the same with a liquid comprising an aqueous solution of an alkali-forming metal compound and an auxiliary acidic constituent, the liquid being recirculated through a cycle comprising an absorption stage in which it is brought into contact with the gaseous mixture at an ordinary temperature for the removal of acidic gas or gases therefrom and an actification stage in which the solution is heated to regenerate it for further use.

By an ordinary temperature is meant a temperature materially below the boiling point of the solution, for example 90° F., and preferably not above 130° F.

I employ an auxiliary acidic constituent which is capable of forming a liquid immiscible with the aqueous solution at the relatively low temperature of the absorption stage and of increased if not complete solubility in the aqueous solution in the actification stage.

I prefer to maintain enough of this auxiliary acidic constituent present in the liquid so that a separation of the liquid into two separate phases (generally in the form of an emulsion) actually takes place. However, when the auxiliary acidic constituent is partially soluble in the solution, I may use a lesser amount, beneficial results having been observed when no actual separation is apparent.

I prefer to employ an auxiliary acidic constituent which is less volatile than the acidic gas or gases to be absorbed, and capable of being displaced by the acidic gas or gases from combination with the alkali-forming metal at ordinary absorption temperatures and of in turn displacing the absorbed acidic gas or gases when the solution is heated, for example, to its boiling point.

More specifically I prefer to employ as auxiliary acidic constituent a phenol, and especially one of the tar acids, phenol, cresol and xylenol, which are possessed of the preferred characteristics recited above. Thus, at temperatures materially below its boiling point, a solution of sodium phenolate, $C_6H_5ONa$, will absorb $H_2S$ from a gas containing it, with separation of phenol in free form. When the solution is boiled in the presence of the thereby liberated phenol, the absorbed $H_2S$ is liberated, and, if proper provisions have been made to insure retention of the phenol, it goes back into solution. The retention of the phenol is not difficult in view of the fact that it is of lower volatility than the $H_2S$, being susceptible of being liquid at ordinary temperatures whereas $H_2S$ is, as is well known, a gas at ordinary temperatures.

While the phenols, and especially the tar acids, are preferred, I may employ other acidic substances having some if not all of the preferred properties recited above.

I have found that such liquids as those described hereinabove, when employed in the manner already recited, have remarkably high purifying capacities and are therefore possessed of numerous advantages which will be apparent from the description contained herein.

The term "alkali-forming metal" as employed herein is intended to designate the alkali metals, (such as sodium and potassium) the alkaline earth metals, (such as calcium and magnesium), and also the ammonium radical ($NH_4$) which acts as a metal and forms alkaline compounds including the alkali $NH_4OH$, and may therefore properly be included under this term for the purpose of defining my invention. The term "phenol" as employed herein is intended to designate any particular phenol or a mixture of more than one phenol, and especially the so-called "tar acids", phenol, cresol and xylenol.

It will be apparent from the description of my absorbent liquid given herein that the auxiliary acidic constituent may be present as free acid or may be present in combination with the alkali-forming metal. Taking phenol, for example, the liquid may in certain portions of the cycle comprise a mixture of an aqueous phase consisting of a solution containing, for example, sodium hydrosulphide and sodium phenolate and a phenolic phase immiscible therewith and consisting of free phenol and water.

In other portions of the cycle, all of the phenol may dissolve, either "chemically" as sodium phenolate or "physically" as phenol itself. So far as concerns the success of my process, I believe it to be immaterial whether such phenol as is in solution is in "chemical" or "physical" solution or both.

Thus, I may prepare the absorbent liquid by adding a solution of a phenol or mixture of phenols, for example, an aqueous solution containing phenol, cresol and xylenol, to a solution of a compound of an alkali-forming metal, such, for example as sodium hydroxide, in sufficient amount to react with all of the latter to form sodium phenolates, with or without an excess of phenols in uncombined form.

In addition to phenols and alkali-forming metal phenolates, the solution may also contain numerous other constituents, such, for example, as ROH, RHS, $R_2S$, RCN, $R_2CO_3$, and $RHCO_3$, (where R represents alkali-forming metal) which are essentially alkaline in reaction and therefore represent alkali-forming metal in an active condition, as well as small amounts of $R_2S_2O_3$ and RSCN, which are neutral in reaction and inert in the process. The proportions of these various materials may vary considerably, depending upon the period of use and the location in the recirculating cycle.

The presence of an auxiliary acidic substance, such as phenol, or a salt thereof, such as a phenolate, in a cyclic process involving hot actification is possessed of great advantage in that the presence of this auxiliary acidic material exerts an extremely favorable effect upon the liberation of the absorbed acidic gases from the solution when the latter is heated in the actification stage. Inasmuch as the absorbing capacity of the recirculated solution is limited by the actification capacity, it will be obvious that this increased efficiency in the actification stage has a direct bearing upon the efficiency and extent of absorption.

On the other hand, I have found that the presence of even large amounts of phenol or its equivalent in the absorption stage does not exert an opposite effect, that is to say, it does not materially decrease the efficiency of the absorption reaction. This is also extremely important. In prior processes, so far as is known, all attempts to utilize factors tending to promote high actification efficiencies have been necessarily limited by the fact that such factors as employed in the prior art have had a corresponding opposite effect upon absorption efficiencies, whereas this is substantially not true of my process.

The utility of my process therefore lies to a large extent in the fact that I am able to maintain an extraordinarily high actification efficiency without a corresponding decrease in the absorption efficiency.

While I do not limit myself to any particular theory as to the ultimate causes and reasons which underlie the success of my invention, nevertheless it would appear that the fact that the solubility of the auxiliary acidic constituent in the liquid changes materially as between the absorption stage and the actification stage has considerable bearing upon the facts noted above.

Thus, the tendency of phenol, for example, to separate out in the form of a liquid phase immiscible with the remainder of the liquid at the low temperatures of the absorption stage may be thought of as at least partially accounting for the fact that the presence of the phenol in the total liquid traversing the absorption stage does not materially reduce absorption efficiency, it being obvious that an acidic substance not in solution, that is to say, out of phase with the absorbent solution proper, has little or no effect upon reactions taking place in the solution phase.

On the other hand, the liberated auxiliary acidic substance carried along with the aqueous solution into the actification stage tends to go back in the solution while the absorbed acidic gases are being driven off, thus displacing the latter and this fact may be thought of as accounting for the marked increase in actification efficiency which is in fact attained.

It may be observed at this point that the separation and re-solution of the phenol may wholly or in part take place as the liquid changes in temperature going from the absorption stage to the actification stage and vice-versa, respectively, instead of or as well as within the absorption and actification stages themselves.

I prefer to employ a sufficient amount of phenol or equivalent auxiliary acidic substance or compound thereof in the liquid to insure that the same will actually be liberated and wholly or partially pass out of solution in the relatively cool absorption stage. Furthermore, I also prefer to maintain in the liquid throughout at least a portion of the actification stage, an amount of the auxiliary acidic substance greater than the molecular equivalent of the alkili-forming metal present in sulphided form (i e., as sulphide or hydrosulphide, as distinguished from alkali-forming metal present in other forms) in the solution traversing that portion of the actification stage at any time, that is to say, more than would be required to react with all of the sulphided alkali-forming metal present to form a salt or salts.

The concentration of the solution may vary considerably, depending primarily upon the content of acidic gases and the degree of separation and purification desired. But in general I prefer to employ a liquid containing from 5% to 20% by weight of alkali-forming metal calculated as ROH (where R represents an alkali-forming metal), and containing a phenol or other auxiliary acidic substance either as such or in combination with all or a portion of the alkali-forming metal. The molar ratio of the alkali-forming metal present in the form of a compound or compounds having an alkaline reaction to the phenol or the phenolate radical or equivalent may be, for example, from 2:1 to 2:3, calculated as ROH and as free acid, respectively.

For efficient actification, it is desirable that the solution be not merely heated to its boiling point but that it be subjected to a countercurrent flow of hot gas (usually steam) at that temperature. Thus, direct steam may be used, serving both to heat the solution and as a carrier gas. Preferably, however, the solution is heated indirectly to such extent as to boil away enough of the solution to furnish the necessary steam, the steam thus evaporated being subsequently condensed and returned. Both direct and indirect heating may be employed if so desired.

It will be apparent from the above that phenol or other auxiliary acidic substance entering the actification stage in free and volatile form tends to be driven off from the solution. I therefore provide against any substantial loss of phenol or equivalent in the actification stage by maintaining the vapor outlet from the actification stage at a temperature sufficiently low to cause the condensation of phenol or similar auxiliary acidic substance.

This may be accomplished, for example, by introducing the solution from the absorption stage to the top of the actifying apparatus at a sufficiently low temperature. Where the temperature of the solution entering the actification stage is too high to prevent loss of phenol or the like, the vapors issuing from the actification stage proper may be carried through a condenser or dephlegmator of either direct or indirect type, maintained at a temperature sufficiently low to cause the condensation of phenol or the like, the condensate thereby obtained being returned to the actification stage proper.

In the event that substantial amounts of phenol or other volatile acidic substance are carried out of the solution in the absorption stage, I may also treat the gas leaving the absorption stage for the recovery of the same. For example, I may wash the gas leaving the absorption stage with water, oil or an alkaline solution, the solution of phenol or phenolate thereby obtained being returned to the recirculating solution.

By reason of the fact that I thus prevent loss of the auxiliary acidic substance from the solution, it is ordinarily not necessary, except perhaps at very extended intervals, to replenish the liquid with respect to the auxiliary acidic substance, but should this be required it may be accomplished, for example, by adding phenol to the solution either as free acid or as phenolate.

Losses of active alkali-forming metal may occur through mechanical losses and through the formation of inert products of side reaction, such as $Na_2S_2O_3$ and $NaSCN$. This requires addition from time to time of alkali-forming metal. This may be accomplished by adding the alkali-forming metal to the solution, either as NaOH or $N_2CO_3$ or in the form of some other alkali-forming metal compound having an alkaline reaction. In the event that the carbonate is employed for this purpose, it is ordinarily decomposed at once in the actification stage, with liberation of $CO_2$, so that the same result is obtained as if the hydroxide were employed.

In the event that ammonia is employed as the alkali-forming metal, provision may also be made to prevent loss of this volatile substance in the actification stage.

In order that my invention may be clearly set forth and understood, I now describe with reference to the accompanying drawing a preferred manner in which it may be carried out and practiced. In the drawing, Figure 1 is a more or less diagrammatic view, partly in elevation and partly in vertical section, of apparatus for purifying a gas mixture from an acidic constituent by means of the process of my invention; and Fig. 2 is a similar view of an alternate form of a portion of the apparatus shown in Fig. 1.

Similar characters of reference designate similar parts in the several views of the drawing.

Referring to the drawing, the gas to be purified, for example, natural gas containing hydrogen sulphide, enters the lower part of the absorber 1 through an inlet 2. The absorber 1 is shown as comprising a conventional bell-and-tray type column, although other types of gas and liquid contact apparatus may be employed. The gas flows upward through the absorber 1 in countercurrent to a descending flow of an absorbent liquid comprising a solution of an alkali-forming metal compound and phenol or phenolate introduced to the absorber 1 through a conduit 3.

As will be clear from the discussion hereinabove, said liquid may comprise, at the time it enters the absorber 1, an aqueous solution of alkali-forming metal phenolate or a mixture or emulsion of such a solution with phenol (i. e. phenol+water) immiscible therewith. The aqueous solution or phase may or may not contain other alkali-forming metal compounds such as NaOH, NaHS, $Na_2S$, $Na_2CO_3$, $NaHCO_3$ and the like. All or a portion of the hydrogen sulphide and analogous acidic impurities or constituents contained in the gas are absorbed by this liquid.

In the instance shown in Fig. 1, it is assumed that the gas exhibits a tendency to carry out substantial amounts of phenol liberated in the absorption reactions, and this being the case, the gas leaving the absorber 1 is caused to flow through a bell-and-tray type column 4 or other gas-and-liquid contact device, preferably located on top of the absorber 1. The gas flows through the column 4 in contercurrent to a small descending flow of water or alkaline solution introduced to the column 4 through a valved conduit 5.

The flow of water or alkaline solution through the column 4 is as small as is found sufficient to remove phenol from the gas. The solution of phenol or phenolate thus obtained passes through a sealed conduit 6 into the absorber 1 where it joins the recirculating liquid, while the purified and substantially phenol-free gas passes out of the column 4 through an outlet 7.

Such additions of alkali-forming metal compound as may from time to time be necessary may be made through the conduit 5 when so desired, and any excess water introduced through this conduit either as such or in the form of a solution can be evaporated in the actification stage.

The liquid reaching the bottom of the absorber 1 and comprising, for example, a mixture or emulsion of an aqueous solution of sodium sulphide or sulphydrate and possibly also sodium hydroxide, carbonate and phenolate, with an immiscible phase of liberated phenol, passes out through a conduit 8 to a pump 9 which delivers it through a conduit 11, an indirect heat exchanger 12 and a conduit 13, to an actifier 14, the construction of which may be similar to that of the absorber 1.

The actifier 14 is, however, provided with means for heating the liquid or solution, such, for example, as an indirect steam coil 15 and a valved conduit 16 for the admission of direct steam to the actifier 14, as desired, the coil 15 and conduit 16 being preferably located at the bottom of the absorber 14.

The conduit 13 is also provided with a valve 17 and a branch conduit 18 having a valve 19 leading to a suitable solution heater 21 from which solution may pass through a conduit 22 to the conduit 13 and the actifier 14. By manipulating the valves 17 and 19, it will be obvious that the degree of heating of the solution entering the actifier 14 may be varied over a considerable range. It is preferred however to limit the temperature of the solution entering the actifier 14 to a temperature somewhat below the boiling point, for example, to about 130° F.

Due to the heating of the solution which takes place in the heat exchanger 12, the actifier 14, and also the heater 21 where the latter is employed, the solution is eventually carried to a temperature approximating its boiling point. This temperature, assisted by the vapors and gases thereby liberated, causes the liberation from the solution of an amount of acidic gases substantially equal to that removed in the absorber 1 and the re-solution of the phenol carried out of the absorber 1 as an immiscible liquid. The regenerated liquid passes out of the actifier 14 through a valved conduit 23 to a pump 24 which delivers it through a conduit 25, the heat exchanger 12, a conduit 26, a cooler 27 and the conduit 3 to the top of the absorber 1, thus completing the cycle.

By reason of the fact that the liquid entering the top of the actifier 14 contains phenol as such, that is to say, in volatile form, it will be obvious that the vapors and gases passing upward through the actifier 14 will tend to cause the volatilization of this phenol, and particularly where the liquid entering the actifier 14 is at a relatively high temperature, for example, in excess of 130° F. Consequently, means for condensing and returning this phenol as well as excess steam to the actifier 14 is required.

In the instance shown in Fig. 1, the vapors and gases issuing from the top of the actifier 14 pass to a dephlegmating column 31 which may be similar in construction to that of the absorber 1, that is to say, of bell-and-tray type. A portion of the liquid reaching the bottom of the column 31 is withdrawn through a conduit 32 and passes to an indirect cooler 33 having a cooling water supply pipe 34. The cooled liquid is then returned by a pump 35 through a conduit 36 to the top of the column 31. The remaining portion of the liquid reaching the bottom of the column 31 passes through a sealed overflow conduit 37 to the actifier 14.

The vapors liberated in the actification stage, and consisting principally of hydrogen sulphide, pass out of the column 31 through an outlet 38 and may be disposed of as desired.

In the instance shown in Fig. 2, the vapors issuing from the top of the actifier 14 pass through a conduit 41 to an indirect type dephlegmator 42 which may be of conventional design, as shown, and is provided with a valved water inlet 43, a water outlet 44, a vapor outlet 45 and a sealed condensate return conduit 46 leading to the actifier 14.

The rate of recirculation of the liquid through the entire cycle will depend upon the hydrogen sulphide content of the foul gas to be purified, the strength of solution employed and the degree of purification desired, and is obviously within the skill of the art. It may be stated, however, that recirculation rates of from 5 to 15 gallons per thousand cubic feet of gas are ordinarily suitable. The amount of steam required for actification may also vary considerably, but it may be stated that in most instances the steam so required may range from less than 1 to 5 pounds of steam per gallon of solution.

By way of illustrating the advantages of my invention, the following figures, illustrative of a single specific instance, may be given:

In this instance, a gas containing 1900 grains of H₂S per 100 cubic feet, measured under standard conditions, was treated under 35 pounds per square inch gauge pressure with a solution originally containing 10% by weight of NaOH and 15% by weight of a mixture of tar acids. The temperatures employed throughout the cycle were as follows:

Temperature of liquid entering absorber_ 85° F.
Temperature of solution entering actifier_ 130° F.
Temperature of solution leaving bottom
  of actifier _____ 212° to 230° F.
Temperature of vapors leaving actifier___ 205° F.
Temperature of vapors leaving dephleg-
  mator _____ 130° F.

The rate of circulation employed averages 11 gallons per thousand cubic feet of gas treated and the steam consumption 1.7 pounds per gallon of solution. Under these conditions, the hydrogen sulphide in the gas being treated was reduced to a concentration of only 50 grains of H₂S per hundred cubic feet, the process thus having a purification efficiency of over 97%. This, in view of the high degree of impurity of the gas before treatment and the low recirculation rate, represents an indication of marked technical and economic merit.

It will be obvious to those skilled in the above that my invention is not limited to any of the specific details given hereinabove by way of illustrative example, but is to be construed as of the scope of the claims hereinafter made.

I claim as my invention:

1. An improved process for removing hydrogen sulfide from gas mixtures which comprises scrubbing the gas with a concentrated aqueous solution of an alkali salt of an acid of the class of phenol and its alkylated substitution products, separating the unabsorbed gas and heating the total liquid product from the absorption step to substantially boiling point, whereby the hydrogen sulphide is expelled, and returning the aqueous liquor to the scrubbing step.

2. An improved process for removing weakly acid constituents from gas mixtures which comprises scrubbing the gas with a concentrated aqueous solution of a salt of a strong base and an acid of the class of phenol and its alkylated substitution products, whereby such acid constituents are absorbed and phenolic acid is precipitated in an easily flowing form, then heating the mixture of the aqueous and phenolic layers to a boiling temperature whereby the acid gas is expelled and the phenolic acid redissolved in the aqueous liquor, and returning this liquor to the scrubbing step, the aforesaid heating step being accomplished in the presence of an excess of the phenolic acid over that quantity which will dissolve.

3. The process of removing an acidic gas such as hydrogen sulphide, carbon dioxide or the like from a gas mixture containing the same, which comprises: recirculating an absorbent liquid through a cycle comprising an absorption stage in which the liquid is brought into contact with the gas mixture at ordinary temperature for the absorption of said acidic gas therefrom, and an actification stage in which the solution is heated to drive off the absorbed acidic gas and is thereby regenerated for further use; said liquid comprising an aqueous solution of an alkali-forming metal compound and a tar acid which tends to form, when present in relatively large amount relative to the liquid, a phase immiscible with said aqueous solution at the temperature of the absorption stage and to return to solution at the higher temperatures of the actification stage, said tar acid being present in sufficiently large amount to form the phase immiscible with said aqueous solution at the temperature of the absorption stage.

4. The process of removing an acidic gas such as hydrogen sulphide, carbon dioxide or the like from a gas mixture containing the same, which comprises recirculating a liquid comprising a solution of an alkali-forming metal compound and a tar acid capable of being, when present in sufficiently large amount, and present in such large amount as to be displaced by said acidic gas from combination with the alkali-forming metal at low temperatures and of forming a liquid not entirely miscible with the solution when so displaced and capable of displacing the absorbed acidic gases and redissolving in the solution when the later is boiled, through a cycle comprising an absorption stage in which the solution is brought into contact with the gas mixture for the absorption of said acidic gas therefrom and an actification stage in which the solution is heated to its boiling point to drive off said absorbed acidic gas and is thereby regenerated for further use.

5. The process of removing an acidic gas such as hydrogen sulphide, carbon dioxide or the like from a gas mixture containing the same, which comprises recirculating a solution containing an alkali-forming metal and a phenol through a cycle comprising an absorption stage, in which the solution is brought into contact with the gas mixture at an ordinary temperature for the absorption of said acidic gas therefrom, and an actification stage, in which the solution is heated to drive off said absorbed acidic gas and is thereby regenerated for further use, the molar ratio of said alkali-forming metal to said phenol being from 2:1 to 2:3, calculated as ROH (where R represents alkali-forming metal) and phenol, and effecting for the absorption stage a change in phase of the phenol from the phase in the actification stage whereby retarding by the phenol of absorption of acidic gas from the gas mixture by the alkali is minimized.

6. The process of removing an acidic gas such as hydrogen sulphide, carbon dioxide or the like from a gas mixture containing the same, which comprises washing the gas mixture in an absorption stage with a solution of an alkali-forming metal and a phenol for the removal of acidic gas therefrom, removing the solution together with thereby liberated phenol and passing it through an actification stage where it is heated to drive off acidic gas removed in the absorption stage with re-solution of phenol and regeneration of the absorbent properties of the solution, the alkali and phenol being present in such proportions relative to the liquid that the phenol is in a different phase in the absorption stage from its phase in the actification stage, and maintaining in at least a portion of the actification stage an amount of phenol in excess of the molecular reaction equivalent of the alkali-forming metal present in sulphided form in the solution traversing said portion, removing the regenerated solution and recirculating it for further absorption of acidic gas.

7. The process of removing an acidic gas such as hydrogen sulphide, carbon dioxide or hydrogen cyanide from a gas mixture containing the same, which comprises washing the flowing gas mixture with an absorbent liquid, removing the liquid, heating it to drive off the absorbed acidic gas and recirculating it over the flowing gas mixture for further absorption of acidic gas, said liquid comprising a solution containing an alkali-forming metal present in a compound or compounds having an alkaline reaction, and a tar acid present as free tar acid or as a phenolate of said alkali-forming metal, the molar ratio of said alkali-forming metal to said tar acid being from 2:1 to 2:3, calculated as ROH (where R represents alkali-forming metal) and free tar acid, respectively, and the alkali forming metal and tar acid being present in sufficiently large proportion relative to the liquid that the tar acid after said heating undergoes a phase-separation in the liquid for the gas washing by the liquid.

8. The process of removing an acidic gas such as hydrogen sulphide, carbon dioxide or hydrogen cyanide from a gas mixture containing the same, which comprises washing the flowing gas mixture with an absorbent liquid, removing the liquid, heating it to drive off the absorbed acidic gas and recirculating it over the flowing gas mixture for further absorption of acidic gas, said liquid comprising a solution containing an alkali-forming metal present in a compound or compounds having an alkaline reaction, and a tar acid present as free tar acid or as a phenolate of said alkali-forming metal, the amount of alkali-forming metal in the solution being from 5% to 20% by weight, considered as ROH (where R represents alkali-forming metal), and the molar ratio of said alkali-forming metal to said tar acid being from 2:1 to 2:3, calculated as ROH (where R represents alkali-forming metal) and free tar acid, respectively.

9. The process of removing an acidic gas such as hydrogen sulphide, carbon dioxide or the like from a gas mixture containing the same which comprises scrubbing the gas mixture with an aqueous solution of an alkali-forming metal and a phenol to absorb acidic gas from said mixture, removing the solution from the gas and introducing it to the top of a gas-and-liquid contact column, supplying sufficient heat to the bottom of the column to drive off the acidic gas removed from the gas mixture in the absorption stage, and recirculating the solution for further absorption, said phenol being present in such relatively large amount as to form after said heating a liquid phase immiscible with said aqueous solution at the temperature of the absorption stage.

10. The process of removing an acidic gas such as hydrogen sulphide, carbon dioxide or the like from a gas mixture containing the same which comprises scrubbing the gas mixture with an aqueous solution of an alkali-forming metal and a phenol to absorb acidic gas from said mixture, removing the solution from the gas and introducing it to the top of a gas-and-liquid contact column, supplying sufficient heat to the bottom of the column to drive off the acidic gas removed from the gas mixture in the absorption stage and recirculating the solution for further absorption, said phenol being present in such relatively large amount as to form after said heating a liquid phase immiscible with said aqueous solution at the temperature of the absorption stage and maintaining a temperature in the vapor outlet from the column sufficiently low to prevent substantial loss of phenol.

11. The process of removing an acidic gas such as hydrogen sulphide, carbon dioxide or the like from a gas mixture containing the same, which comprises scrubbing the gas mixture with an aqueous solution of an alkali-forming metal and a phenol to absorb acidic gas from said mixture, removing the solution from the gas and introducing it to the top of a gas-and-liquid contact column, supplying sufficient heat to the bottom of the column to drive off the acidic gas removed from the gas mixture in the absorption stage, and recirculating the solution for further absorption, said phenol being present in such relatively large amount as to form after said heating a liquid phase immiscible with said aqueous solution at the temperature of the absorption stage, the temperature of the solution entering the top of the column being sufficiently low to prevent substantial loss of phenol, 12. The process of removing an acidic gas such as hydrogen sulphide, carbon dioxide or the like from a gas mixture containing the same, which comprises recirculating an aqueous solution containing an alkali-forming metal and a phenol through a cycle comprising an absorption stage, in which the solution is brought into contact with the gas mixture for the absorption of said acidic gas therefrom, and an actification stage, in which the solution is heated to drive off said absorbed acidic gas and is thereby regenerated for further absorption of said acidic gas, said phenol being present in such relatively large amount as to form after said heating a liquid phase immiscible with said aqueous solution at the temperature of the absorption stage, subjecting the vapors from said actification stage to condensation for the separation of phenol therefrom, and returning the thereby separated phenol to the solution.

13. The process of removing an acidic gas such as hydrogen sulphide, carbon dioxide or the like from a gas mixture containing the same which comprises recirculating an aqueous solution containing an alkali-forming metal and a phenol through a cycle comprising an absorption stage, in which the solution is brought into contact with the gas mixture for the absorption of said acidic gas therefrom, and an actification stage, in which the solution is heated to drive off said absorbed acidic gas and is thereby regenerated for further absorption of said acidic gas, said phenol being present in such relatively large amount as to form after said heating a liquid phase immiscible with said aqueous solution at the temperature of the absorption stage, scrubbing the gas leaving the absorber with a phenol-absorbent liquid to remove phenol carried out of the solution by the gas, and returning the phenol solution thereby obtained to the recirculating solution.

14. A process as claimed in claim 5 and in which the alkali-forming metal is sodium.

15. A process as claimed in claim 5 and in which the alkali-forming metal is ammonium.

16. A process as claimed in claim 5 and in which the alkali-forming metal is potassium.

17. The process of removing an acidic gas such as hydrogen sulphide, carbon dioxide or hydrogen cyanide from a gas mixture containing the same, which comprises: washing the gas mixture with an absorbent liquid, removing the liquid, heating it to drive off the absorbed acidic gas and returning to again wash gas mixture as aforesaid for further absorption of acidic gas, said liquid comprising a solution containing an alkali-forming metal present in a compound or compounds having an alkali reaction and an acid constituent selected from the group consisting of tar acid, phenol, a mixture of more than one phenol, cresol and xylenol, the molar ratio of said alkali-forming to the selected acid constituent being from 2:1 to 2:3 calculated as ROH (where R represents alkali-forming metal) and free tar acid respectively, and the alkali forming metal and tar acid being present in sufficiently large proportion relative to the liquid that the selected acid constituent after said heating undergoes a phase-separation in the liquid during the gas washing by the liquid.

18. The process of removing an acidic gas such as hydrogen sulphide, carbon dioxide or hydrogen cyanide from a gas mixture containing the same, which comprises: washing the gas mixture with an absorbent liquid, removing the liquid, heating it to drive off the absorbed acidic gas and returning to again wash gas mixture as aforesaid for further absorption of acidic gas, said liquid comprising a solution containing an alkali-forming metal present in a compound or compounds having an alkali reaction and an acid constituent selected from the group consisting of tar acid, phenol, a mixture of more than one phenol, cresol and xylenol—the amount of alkali-forming metal in the solution being from 5% to 20% by weight, considered as ROH (where R represents alkali-forming metal, and—the molar ratio of said alkali-forming to the selected acid constituent being from 2:1 to 2:3 calculated as ROH (where R represents alkali-forming metal) and free tar acid respectively.

JOSEPH A. SHAW.